(12) United States Patent
Takemoto et al.

(10) Patent No.: US 11,865,638 B2
(45) Date of Patent: Jan. 9, 2024

(54) LASER WELDING DEVICE

(71) Applicant: AISIN FUKUI CORPORATION, Echizen (JP)

(72) Inventors: Kouji Takemoto, Echizen (JP); Kazuyoshi Miyamoto, Echizen (JP); Tomoaki Yoshida, Echizen (JP); Daichi Sumimori, Kani (JP); Hiroshi Hasegawa, Kani (JP)

(73) Assignee: AISIN FUKUI CORPORATION, Echizen (JP)

( * ) Notice: Subject to any disclaimer, the term of this patent is extended or adjusted under 35 U.S.C. 154(b) by 245 days.

(21) Appl. No.: 17/299,414

(22) PCT Filed: Dec. 4, 2019

(86) PCT No.: PCT/JP2019/047400
§ 371 (c)(1),
(2) Date: Jun. 3, 2021

(87) PCT Pub. No.: WO2020/116502
PCT Pub. Date: Jun. 11, 2020

(65) Prior Publication Data
US 2022/0055150 A1    Feb. 24, 2022

(30) Foreign Application Priority Data

Dec. 4, 2018  (JP) .................. 2018-227552

(51) Int. Cl.
*B23K 26/12*  (2014.01)
*B23K 26/70*  (2014.01)
(Continued)

(52) U.S. Cl.
CPC ............ *B23K 26/127* (2013.01); *B23K 26/16* (2013.01); *B23K 26/702* (2015.10); *B23K 26/123* (2013.01); *B23K 26/21* (2015.10)

(58) Field of Classification Search
CPC ...... B23K 26/123; B23K 26/21; B23K 26/16; B23K 26/702; B23K 26/127
(Continued)

(56) References Cited

U.S. PATENT DOCUMENTS 3,817,733 A * 6/1974 Thuler .................. C03B 23/18
65/153
4,021,898 A * 5/1977 Willis .................. H03H 3/04
29/25.35
(Continued)

FOREIGN PATENT DOCUMENTS

CN   107745182 A   3/2018
JP   S57-000537 A   1/1982
(Continued)

OTHER PUBLICATIONS

International Search Report (PCT/ISA/210) with translation and Written Opinion (PCT/ISA/237) dated Feb. 18, 2020, by the Japanese Patent Office as the International Searching Authority for International Application No. PCT/JP2019/047400. (8 pages).

(Continued)

*Primary Examiner* — Jimmy Chou
(74) *Attorney, Agent, or Firm* — BUCHANAN INGERSOLL & ROONEY PC

(57) ABSTRACT

A laser welding device includes a chamber which has an internal space in which a workpiece is disposed, a laser beam irradiation unit which irradiates the workpiece with a laser beam to weld the workpiece, a vacuum pump which suctions air in the chamber to decrease a pressure in the chamber, a laser transmission window through which the laser beam emitted from the laser beam irradiation unit is transmitted, and a shutter which is disposed on the chamber side with respect to the laser transmission window and
(Continued)

closed when the pressure in the chamber is returned to the atmospheric pressure after laser welding.

9 Claims, 3 Drawing Sheets

(51) Int. Cl.
*B23K 26/16* (2006.01)
*B23K 26/21* (2014.01)

(58) Field of Classification Search
USPC .................................................. 219/121.86
See application file for complete search history.

(56) References Cited

U.S. PATENT DOCUMENTS

| | | | | |
|---|---|---|---|---|
| 4,278,867 | A * | 7/1981 | Tan | B23K 26/123 |
| | | | | 219/121.64 |
| 4,417,948 | A * | 11/1983 | Mayne-Banton | B29C 59/16 |
| | | | | 219/121.85 |
| 4,609,566 | A * | 9/1986 | Hongo | G03F 1/72 |
| | | | | 118/725 |
| 4,689,467 | A * | 8/1987 | Inoue | B23K 26/0665 |
| | | | | 219/121.84 |
| 4,752,668 | A * | 6/1988 | Rosenfield | G03F 1/72 |
| | | | | 219/121.85 |
| 4,780,590 | A * | 10/1988 | Griner | H01L 21/67115 |
| | | | | 219/121.84 |
| 4,979,181 | A | 12/1990 | Nakanose et al. | |
| 5,530,221 | A * | 6/1996 | Benda | B29C 64/153 |
| | | | | 219/121.83 |
| 5,660,744 | A * | 8/1997 | Sekine | H01J 37/3266 |
| | | | | 204/298.37 |
| 5,788,034 | A * | 8/1998 | Maruki | F16H 45/02 |
| | | | | 219/121.16 |
| 7,514,015 | B2 * | 4/2009 | Elliott | H01L 21/67005 |
| | | | | 216/60 |
| 8,721,772 | B2 * | 5/2014 | Lee | B01D 46/42 |
| | | | | 55/385.2 |
| 9,919,372 | B2 * | 3/2018 | Matsuda | B23K 3/04 |
| 2003/0038122 | A1 * | 2/2003 | Yamazaki | H01L 21/02532 |
| | | | | 219/121.76 |
| 2003/0106881 | A1 * | 6/2003 | Lee | H01J 37/32082 |
| | | | | 219/121.68 |
| 2008/0003081 | A1 * | 1/2008 | Kasumi | H01L 21/67748 |
| | | | | 414/217 |
| 2008/0067160 | A1 * | 3/2008 | Suutarinen | B23K 26/1224 |
| | | | | 219/121.67 |
| 2010/0108648 | A1 * | 5/2010 | Koseki | B23K 26/12 |
| | | | | 219/121.84 |
| 2010/0119927 | A1 | 5/2010 | Bauer | |
| 2011/0174790 | A1 * | 7/2011 | Suzuki | H01L 21/67115 |
| | | | | 219/121.84 |
| 2012/0225568 | A1 * | 9/2012 | Izawa | H01L 21/02126 |
| | | | | 257/E21.328 |
| 2013/0213945 | A1 * | 8/2013 | Stegmann | G01N 23/04 |
| | | | | 219/121.83 |
| 2013/0341313 | A1 * | 12/2013 | Himmelsbach | B23K 26/70 |
| | | | | 219/121.86 |
| 2015/0201469 | A1 * | 7/2015 | Shimomura | H05B 6/6411 |
| | | | | 219/754 |
| 2015/0228528 | A1 * | 8/2015 | Behdjat | H01L 21/6875 |
| | | | | 219/444.1 |
| 2017/0162416 | A1 * | 6/2017 | Miyazawa | H01J 37/32715 |
| 2021/0078104 | A1 * | 3/2021 | Määttänen | B23K 26/1224 |
| 2022/0023970 | A1 | 1/2022 | Takemoto et al. | |
| 2022/0055151 | A1 | 2/2022 | Takemoto et al. | |

FOREIGN PATENT DOCUMENTS

| | | | |
|---|---|---|---|
| JP | S62-107891 | A | 5/1987 |
| JP | H02290687 | A | 11/1990 |
| JP | H03145149 | A | 6/1991 |
| JP | 07176329 | A * | 7/1995 |
| JP | 2010114077 | A | 5/2010 |
| JP | 5234471 | B2 | 7/2013 |
| JP | 2016120506 | A | 7/2016 |
| JP | 2017131904 | A | 8/2017 |
| WO | 2011145514 | A1 | 11/2011 |

OTHER PUBLICATIONS

U.S. Appl. No. 17/299,500, filed Jun. 3, 2021, Kouji Takemoto et al.
U.S. Appl. No. 17/299,385, filed Jun. 3, 2021, Kouji Takemoto et al.
Office Action (The First Office Action) dated Jul. 28, 2022, by the State Intellectual Property Office of People's Republic of China in Chinese Patent Application No. 201980080747.3 and an English Translation of the Office Action. (15 pages).
Office Action (The First Office Action) dated Aug. 29, 2022, by the State Intellectual Property Office of People's Republic of China in Chinese Patent Application No. 201980080778.9 and an English Translation of the Office Action. (11 pages).
Office Action (Notice of Reasons for Refusal) dated Oct. 11, 2022, by the Japan Patent Office in Japanese Patent Application No. 2018-227489 and an English translation of the Office Action. (6 pages).
Office Action (Notice of Reasons for Refusal) dated Oct. 11, 2022, by the Japan Patent Office in Japanese Patent Application No. 2018-227491 and an English translation of the Office Action. (7 pages).

* cited by examiner

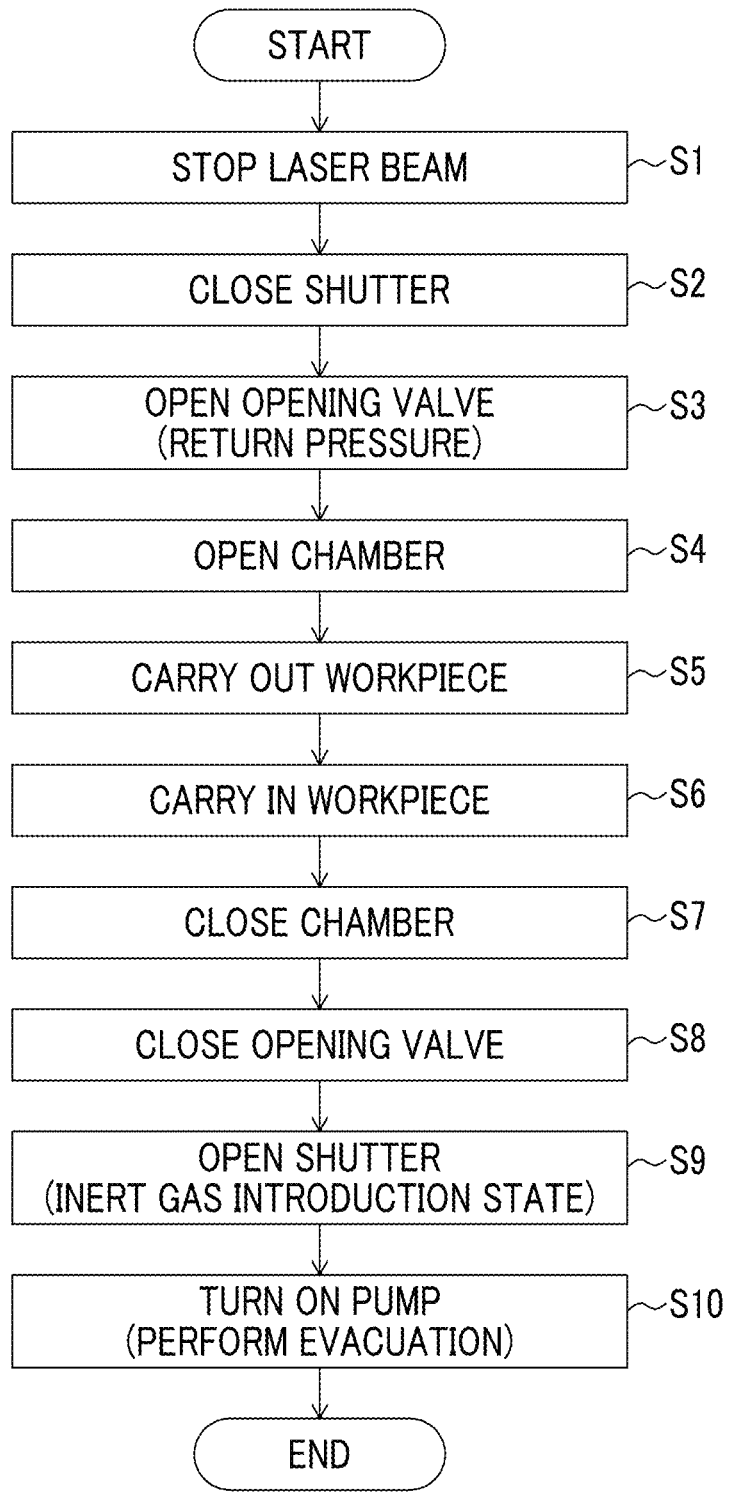

LASER WELDING DEVICE

TECHNICAL FIELD

The present invention relates to a laser welding device, and more particularly, to a laser welding device including a laser beam irradiation unit that irradiates a workpiece with a laser beam to weld the workpiece.

BACKGROUND ART

In the related art, a laser welding device including a laser beam irradiation unit that irradiates a workpiece with a laser beam to weld the workpiece is known. For example, a laser welding device is disclosed in Japanese Patent No. 5234471.

In Japanese Patent No. 5234471, a laser welding device is disclosed, which includes a chamber having an internal space in which a workpiece is disposed, a laser beam irradiation unit which irradiates the workpiece with a laser beam to weld the workpiece, a pump which suctions air in the chamber to decrease a pressure in the chamber, and a laser transmission window through which the laser beam emitted from the laser beam irradiation unit can be transmitted. In the laser welding device of Japanese Patent No. 5234471, when welding the workpiece in the low-pressure chamber, a shield gas is introduced from the laser transmission window side toward the chamber side so that solidified particles of metal vapor generated during the welding do not adhere to the laser transmission window.

CITATION LIST

Patent Literature

[PTL 1] Japanese Patent No. 5234471

SUMMARY OF INVENTION

Technical Problem

In the laser welding device of Japanese Patent No. 5234471, when welding the workpiece under a low pressure, the solidified particles of the metal vapor are prevented from adhering to the laser transmission window by introducing the shield gas. However, after welding the workpiece under the low pressure, in a case where atmospheric pressure air flows into the low-pressure chamber when returning an inside of the chamber to the atmospheric pressure, a flow having a higher flow velocity is generated in the chamber than that during welding under the low pressure. Therefore, it is difficult to prevent the solidified particles of the metal vapor in the chamber from reaching the laser transmission window due to the flow only by introducing the shield gas. Therefore, it is desired to prevent the solidified particles of metal vapor from adhering to the laser transmission window when the pressure in the chamber is returned to the atmospheric pressure after welding the workpiece under a low pressure.

The present invention is made to solve the above problems, and an object of the present invention is to provide a laser welding device in which solidified particles of the metal vapor can be prevented from adhering to the laser transmission window when the pressure in the chamber is returned to the atmospheric pressure after welding the workpiece under a low pressure.

Solution to Problem

In order to achieve the above object, according to one aspect of the present invention, there is provided a laser welding device including: a chamber which has an internal space in which a workpiece is disposed; a laser beam irradiation unit which irradiates the workpiece with a laser beam to weld the workpiece; a pump which suctions air in the chamber and decreases a pressure in the chamber; a laser transmission window through which the laser beam emitted from the laser beam irradiation unit is transmitted; and a shutter which is disposed on the chamber side with respect to the laser transmission window and closed when the pressure in the chamber is returned to an atmospheric pressure after laser welding.

In the laser welding device according to one aspect of the present invention, as described above, the shutter is provided, which is disposed on the chamber side with respect to the laser transmission window and closed when the pressure in the chamber is returned to the atmospheric pressure after the laser welding. Accordingly, when the workpiece is welded under a low pressure and then the chamber is returned to the atmospheric pressure, it is possible to prevent the solidified particles of the metal vapor in the chamber from reaching the laser transmission window, and thus, it is possible to prevent the solidified particles of the metal vapor from adhering to the laser transmission window. As a result, it is possible to prevent particles from adhering to the laser transmission window and blocking the transmission of the laser beam, and thus, the workpiece can be stably welded by the laser beam. Further, by providing the shutter, it is not necessary to gradually return the inside of the chamber to the atmospheric pressure so as not to generate a flow having a high flow velocity, and thus, the inside of the chamber can be rapidly returned to the atmospheric pressure. As a result, a time required to return to the atmospheric pressure can be shortened, and thus, it is possible to suppress a decrease in production efficiency of welding the workpiece.

In the laser welding device according to the above one aspect, preferably, the laser welding device further includes an opening unit which is provided in the chamber and opened when the pressure in the chamber is returned to the atmospheric pressure; and a control unit which performs control, when the pressure in the chamber is returned to the atmospheric pressure, to stop irradiation of the laser beam performed by the laser beam irradiation unit, close the shutter, and then open the opening unit. According to this configuration, it is possible to prevent the laser beam from being blocked by the shutter by closing the shutter after stopping the irradiation of the laser beam. Further, even when the atmospheric pressure air flows into the chamber and a flow having a high flow velocity is generated by opening the opening unit after closing the shutter, it is possible to prevent the flow from reaching the laser transmission window. As a result, it is possible to effectively prevent the solidified particles of the metal vapor from adhering to the laser transmission window.

In the laser welding device according to the above one aspect, preferably, the shutter is made of a material which does not allow solidified particles of metal vapor generated during welding to pass through when the shutter is closed. According to this configuration, by closing the shutter, it is possible to reliably prevent the solidified particles of the metal vapor from reaching the laser transmission window.

In the laser welding device according to the above one aspect, preferably, the laser welding device may further include a tubular portion through which the laser beam emitted from the laser beam irradiation unit passes and which communicates with the chamber, in which the laser transmission window and the shutter are disposed in the tubular portion. According to this configuration, the tubular portion having an internal dimension that allows the laser beam to pass through can be closed by the shutter. Therefore, an area closed by the shutter can be reduced as compared with a case where a portion of the chamber having a relatively large volume in which the workpiece is disposed is closed by the shutter. As a result, it is possible to prevent a size of the shutter from increasing.

In this case, preferably, the tubular portion includes a first tubular portion in which the laser transmission window and the shutter are disposed and a second tubular portion which is disposed to be adjacent to the chamber side with respect to the first tubular portion and has an area larger than that of the first tubular portion in a cross section perpendicular to an optical axis direction of the laser beam. According to this configuration, the first tubular portion having a cross-sectional area smaller than that of the second tubular portion can be closed by the shutter, and thus, it is possible to effectively prevent the size of the shutter from increasing. Further, a volume of a space between the workpiece (chamber) and the laser transmission window can be increased by the second tubular portion. Therefore, when the workpiece is welded under a low pressure, the metal vapor generated from a welding position of the workpiece can be prevented from reaching the laser transmission window. As a result, it is possible to prevent the solidified particles of the metal vapor from adhering to the laser transmission window both during welding and when returning to the atmospheric pressure after the welding.

In the laser welding device according to the above one aspect, preferably, the laser welding device further includes a gas introduction unit which is disposed on the chamber side of the laser transmission window and introduces an inert gas toward the chamber side. According to this configuration, when the workpiece is welded under a low pressure, the metal vapor generated from the welding position of the workpiece can be pushed back to the chamber side by the inert gas, and thus, it is possible to effectively prevent the metal vapor from reaching the laser transmission window.

In this case, preferably, the gas introduction unit is disposed between the shutter and the laser transmission window. According to this configuration, the gas introduction unit and the chamber can be separated by a shutter. Therefore, when the workpiece is welded under a low pressure and then the pressure in the chamber is returned to the atmospheric pressure, it is possible to prevent the solidified particles of the metal vapor from reaching the gas introduction unit. As a result, it is possible to prevent particles from adhering to and clogging the gas introduction unit. Further, even when a space in which the laser transmission window is disposed is closed by the shutter in a low pressure state, the pressure can be increased by introducing the inert gas from the gas introduction unit, and thus, it is possible to prevent the space in which the laser transmission window is disposed from having a pressure lower than that on the chamber side. As a result, when the shutter is opened, it is possible to prevent the solidified particles of the metal vapor from entering the laser transmission window side.

In the configuration in which the gas introduction unit is disposed between the shutter and the laser transmission window, preferably, the laser welding device further includes a control unit which controls opening or closing of the shutter, in which the control unit is configured to control opening the shutter in a state where the inert gas is introduced from the gas introduction unit when the pressure in the chamber is reduced by the pump. According to this configuration, it is possible to effectively prevent the pressure in the space where the laser transmission window is disposed from being lower than that on the chamber side. Therefore, when the shutter is opened, it is possible to effectively prevent the solidified particles of the metal vapor from entering the laser transmission window side.

In the laser welding device according to the above one aspect, preferably, the shutter includes a gate valve. According to this configuration, the space in which the laser transmission window is disposed can be reliably sealed with respect to the chamber side by the gate valve.

Advantageous Effects of Invention

According to the present invention, as described above, when the workpiece is welded under a low pressure and then the chamber is returned to the atmospheric pressure, it is possible to prevent the solidified particles of the metal vapor from adhering to the laser transmission window.

BRIEF DESCRIPTION OF DRAWINGS

FIG. 5 is a flowchart for illustrating a workpiece replacement process performed by a control unit of the laser welding device according to one embodiment.

DESCRIPTION OF EMBODIMENTS

Hereinafter, embodiments of the present invention will be described.

First, a configuration of a laser welding device 1 according to one embodiment of the present invention will be described with reference to FIGS. 1 to 4.

(Laser Welding Device)

Figure 1:
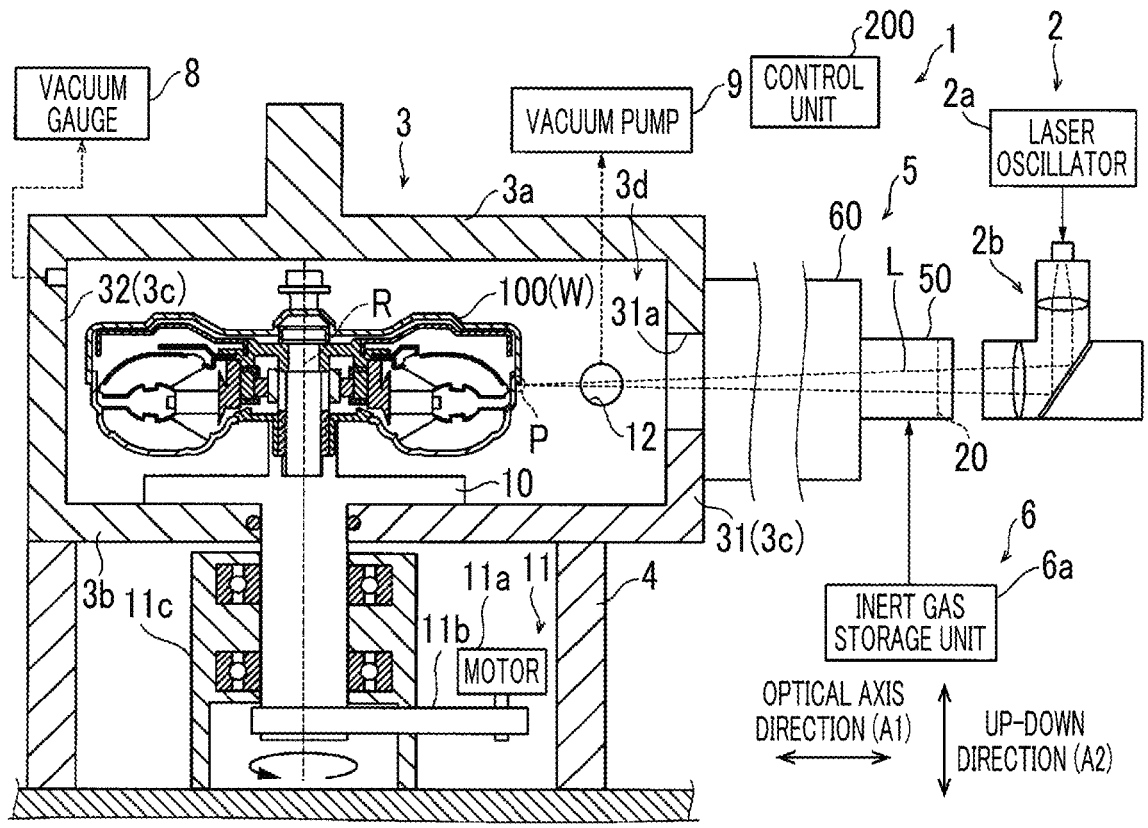
FIG. 1 is a schematic cross-sectional view illustrating the entire configuration of a laser welding device according to one embodiment.

As illustrated in FIG. 1, the laser welding device 1 is configured to perform welding, by a laser beam L, on a torque converter 100 (hereinafter, workpiece W) that transmits rotational torque from an engine to a shaft of a transmission. Specifically, the laser welding device 1 includes a laser beam irradiation unit 2, a chamber 3, a leg portion 4, a tubular portion 5, an inert gas supply unit 6, a shutter 7 (refer to FIG. 2), a vacuum gauge 8, a vacuum pump 9, a support portion 10, and a rotation drive mechanism 11. Further, the laser welding device 1 includes a control unit 200 that controls each unit. The vacuum pump 9 is an example of a "pump" in claims.

The laser beam irradiation unit 2 is configured to irradiate the workpiece W with the laser beam L to weld the workpiece W. Here, the laser beam irradiation unit 2 uses known laser such as a $CO_2$ laser, a YAG (Yttrium aluminum garnet) laser, a fiber laser, or a disk laser. Specifically, the laser beam irradiation unit 2 includes a laser oscillator 2a that generates the laser beam L and an optical system 2b that adjusts a focus of the laser beam L generated by the laser oscillator 2a. Further, the laser beam irradiation unit 2 has a long focal length (focal length F: about 900 [mm]). In the workpiece W, a point to which the laser beam L from the laser beam irradiation unit 2 is applied is defined as a processing point P.

Here, a direction in which an optical axis of the laser beam L emitted from the optical system 2b in the laser beam irradiation unit 2 extends is defined as an optical axis direction A1. Further, a direction orthogonal to the optical axis direction A1 and an up-down direction A2 is defined as a width direction A3.

Figure 2:
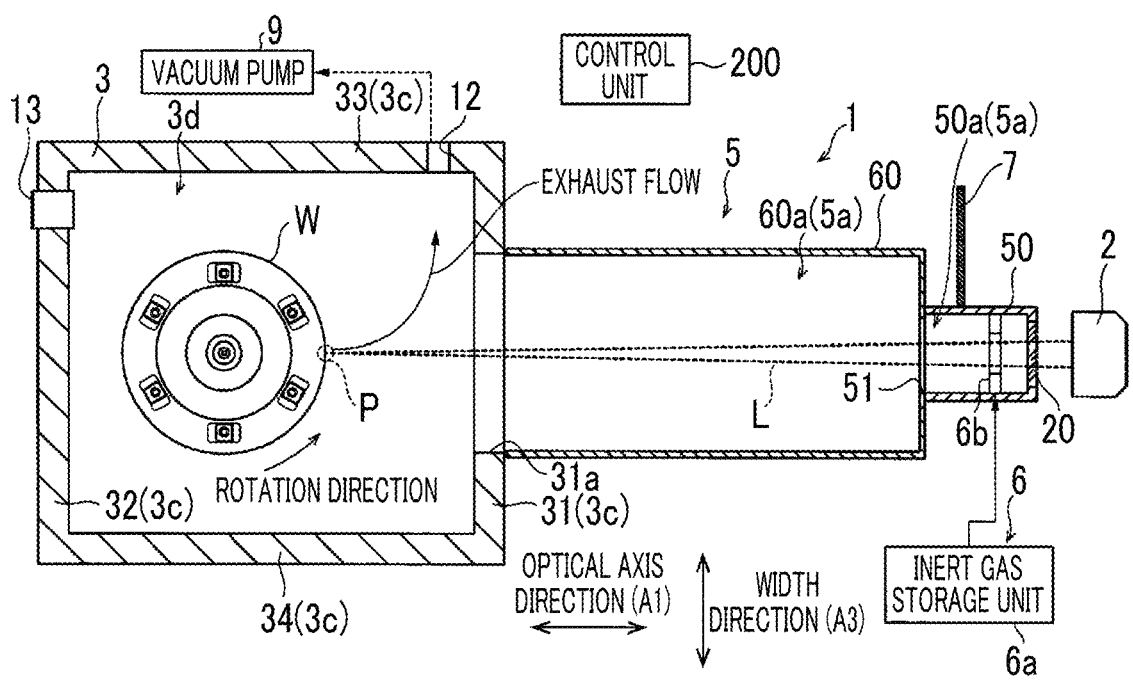
FIG. 2 is a schematic cross-sectional view illustrating a chamber and a tubular portion in the laser welding device according to one embodiment.

As illustrated in FIGS. 1 and 2, the chamber 3 is configured to accommodate the workpiece W therein. Specifically, the chamber 3 includes an upper wall portion 3a, a lower wall portion 3b, a side wall portion 3c provided between the upper wall portion 3a and the lower wall portion 3b, and an internal space 3d surrounded by the upper wall portion 3a, the lower wall portion 3b, and the side wall portion 3c. The side wall portion 3c has a first side wall portion 31 in which an opening 31a through which the laser beam L passes is formed, and a second side wall portion 32 facing the first side wall portion 31 in the optical axis direction A1. The second side wall portion 32 includes an opening valve 13 that is opened when the pressure in the chamber 3 that has been reduced to low pressure is returned to the atmospheric pressure. Further, the side wall portion 3c has a third side wall portion 33 in which an exhaust port 12 connected to the vacuum pump 9 is formed, and a fourth side wall portion 34 facing the third side wall portion 33 in the width direction A3. Here, the chamber 3 is made of a metal such as aluminum. The opening valve 13 is an example of an "opening unit" in the claims.

Further, in the chamber 3, the internal space 3d is set to a low vacuum atmosphere (about 0.1 kPa) by adjusting a pressure of the internal space 3d using the vacuum gauge 8 and the vacuum pump 9. That is, the chamber 3 has a low-pressure internal space 3d in which the workpiece W is disposed.

The leg portion 4 extends in the up-down direction A2 and supports the chamber 3 from below. In the leg portion 4, an upper end portion is attached to a lower end portion of the lower wall portion 3b, and a lower end portion is attached to a floor.

The tubular portion 5 allows the laser beam L from the laser beam irradiation unit 2 to transmit and communicates with the chamber 3. Specifically, the tubular portion 5 includes a first tubular portion 50 having a circular tube shape that is disposed on an incident side in the optical axis direction A1 side and has a laser transmission window 20 through which the laser beam L can be transmitted, and a second tubular portion 60 having a rectangular tube shape that has a space 60a through which the laser beam L passes and is adjacent to an exit side of the first tubular portion 50 in the optical axis direction A1. Here, the first tubular portion 50 has a space 50a through which the laser beam L passes. The space 50a of the first tubular portion 50 communicates with the internal space 3d of the chamber 3 via the space 60a of the second tubular portion 60. The tubular portion 5 is formed with an internal space 5a in which the space 50a of the first tubular portion 50 and the space 60a of the second tubular portion 60 are combined.

As a result, the laser beam L from the laser beam irradiation unit 2 passes through the laser transmission window 20, the space 50a of the first tubular portion 50, the space 60a of the second tubular portion 60, and the internal space 3d of the chamber 3 in this order and reaches the workpiece W.

The inert gas supply unit 6 is configured to supply an inert gas (nitrogen, argon, carbon dioxide, helium, or the like) into the tubular portion 5. Specifically, the inert gas supply unit 6 includes an inert gas storage unit 6a that stores the inert gas and a gas injection nozzle 6b that injects the inert gas supplied from the inert gas storage unit 6a into the internal space 5a of the tubular portion 5. The gas injection nozzle 6b is an example of a "gas introduction unit" in the claims.

The shutter 7 is configured to block the internal space 5a on an exit side in the optical axis direction A1 from the laser transmission window 20. Specifically, the shutter 7 moves in a direction orthogonal to the optical axis direction A1, and thus, can switch communication or cutoff between a space from the laser transmission window 20 of the first tubular portion 50 to the shutter 7 and the internal space 3d of the chamber 3. The shutter 7 is disposed in the first tubular portion 50.

As the vacuum gauge 8, a known vacuum gauge such as an ionization vacuum gauge is used. As the vacuum pump 9, a known vacuum pump such as a rotary type vacuum pump is used. The vacuum pump 9 is configured to suction air in the chamber 3 to form a low pressure of the internal space 3d of the chamber 3.

The support portion 10 is configured to rotatably support the workpiece W around a rotation axis R along the up-down direction A2. The support portion 10 is connected to the rotation drive mechanism 11. Accordingly, the support portion 10 is rotated around the rotation axis R by drive of the rotation drive mechanism 11. Further, since the workpiece W is attached to the support portion 10, the workpiece W rotates as the support portion 10 rotates around the rotation axis R.

The rotation drive mechanism 11 is configured to rotate the support portion 10 around the rotation axis R. Specifically, the rotation drive mechanism 11 includes a motor 11a, a belt 11b having one end portion hung on the motor 11a and the other end portion hung on the support portion 10, and a bearing 11c supporting the support portion 10.

The laser transmission window 20 is configured so that the laser beam emitted from the laser beam irradiation unit 2 can be transmitted therethrough. Further, the laser transmission window 20 is configured so that air does not pass therethrough. Thereby, it is possible to keep an inside of the chamber 3 at a low pressure. The laser transmission window 20 is made of quartz glass. Further, the laser transmission window 20 is formed in a disk shape having a diameter larger than a diameter of the laser beam L.

The tubular portion 5 includes a first tubular portion 50 in which the laser transmission window 20 and the shutter 7 are disposed, and a second tubular portion 60 which is disposed to be adjacent to the chamber 3 side with respect to the first tubular portion 50 and has an area larger than that of the first tubular portion 50 in a cross section perpendicular to the optical axis direction A1 of the laser beam L. That is, the laser transmission window 20 and the shutter 7 are disposed in the tubular portion 5.

The first tubular portion 50 has a cylindrical shape having an opening 51 at an end portion on the chamber 3 side in the optical axis direction A1. That is, a cross-sectional shape of the first tubular portion 50 orthogonal to the optical axis direction A1 has a circular shape.

The second tubular portion 60 has a rectangular tubular shape having a rectangular cross-sectional shape. That is, a cross-sectional shape of the second tubular portion 60 orthogonal to the optical axis direction A1 has a rectangular shape. The second tubular portion 60 may have a cross-sectional shape such as a polygon or an ellipse other than a quadrangle. Further, the second tubular portion 60 has a constant cross-sectional shape along the optical axis direction A1. Further, the second tubular portion 60 has a length longer than that of the first tubular portion 50 in the optical axis direction A1. Further, the second tubular portion 60 has a length longer than that of the first tubular portion 50 also in the up-down direction A2 and the width direction A3. That is, a volume of the space 60a of the second tubular portion 60 is larger than a volume of the space 50a of the first tubular portion 50.

Here, when the processing point P of the workpiece W is irradiated with the laser beam L, metal vapor derived from the workpiece W is generated from the processing point P (welding position). After the metal vapor is generated, the metal vapor is cooled to become a granular solid (fume). The metal vapor is generated from the processing point P to the irradiation side of the laser beam L. The generated metal particles are mainly suctioned and discharged from the exhaust port 12. However, the metal particles are not suctioned to the exhaust port 12 and remain in the internal space 3d of the chamber 3 in which the workpiece W is disposed or the internal space 5a of the tubular portion 5. The generated metal particles have a particle size of about 0.1 μm.

The exhaust port 12 is connected to the vacuum pump 9. The exhaust port 12 is provided in the side wall portion 3c between the workpiece W and the tubular portion 5 in the optical axis direction A1. Further, the exhaust port 12 is provided in the side wall portion 3c (third side wall portion 33) on a downstream side in the rotation direction of the workpiece W in the width direction A3. Accordingly, a flow of an exhaust gas can be directed away from the workpiece W, and thus, it is possible to suppress generation of a fast air flow in the welded portion of the workpiece W. As a result, it is possible to suppress waviness of the welded portion.

The opening valve 13 is provided in the chamber 3. Specifically, the opening valve 13 is provided in the side wall portion 3c (second side wall portion 32) on a side opposite to the tubular portion 5 with respect to the workpiece W in the optical axis direction A1. The opening valve 13 is closed when the pressure inside the chamber 3 is reduced, and is opened when the pressure is returned to the atmospheric pressure.

Figure 3:
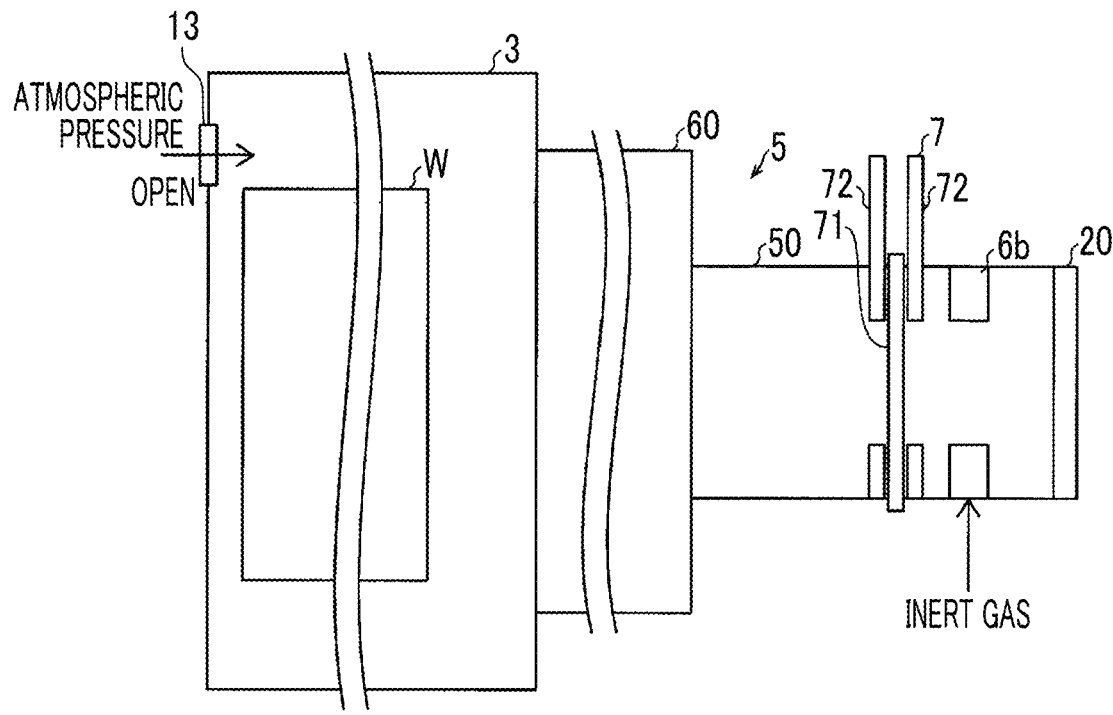
FIG. 3 is a diagram illustrating a state where a shutter of the laser welding device according to one embodiment is closed.

Here, in the present embodiment, as illustrated in FIG. 3, the shutter 7 is disposed on the chamber 3 side with respect to the laser transmission window 20, and is configured so that the shutter 7 is closed when the pressure in the chamber 3 is returned to the atmospheric pressure after laser welding. Further, the shutter 7 is made of a material that does not allow solidified particles of the metal vapor generated during the welding when the shutter 7 is closed to pass through the shutter 7. Specifically, the shutter 7 is made of a metal material. Further, the shutter 7 includes a gate valve. That is, when the shutter 7 is closed, a space in which the laser transmission window 20 is disposed is sealed with respect to the chamber 3.

Figure 4:
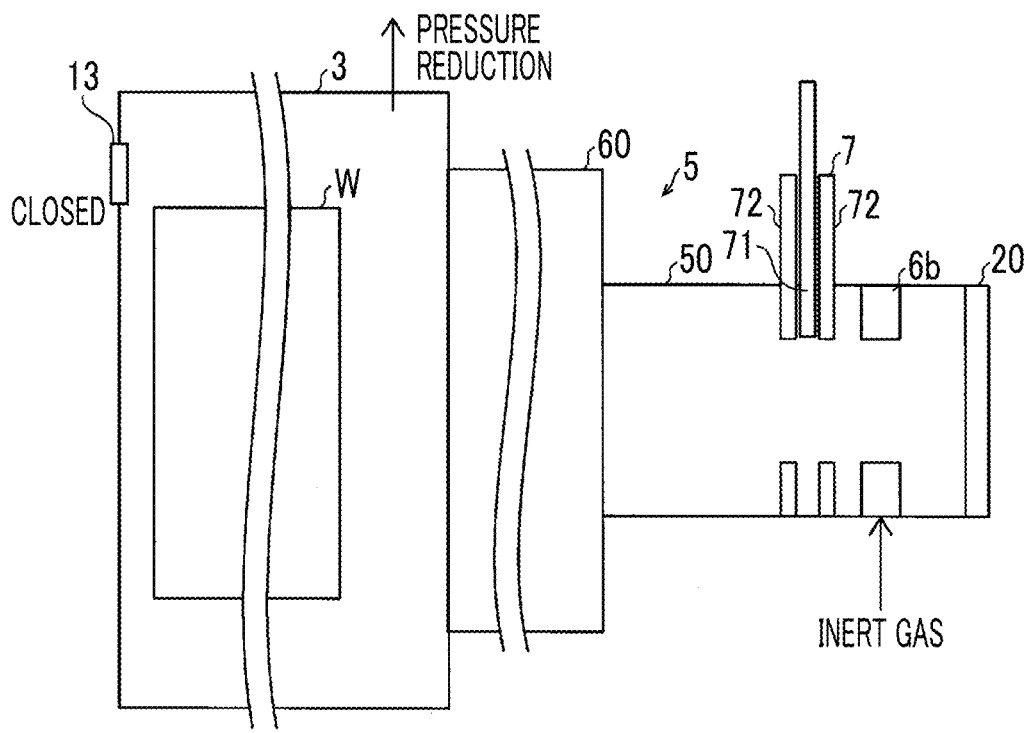
FIG. 4 is a diagram illustrating a state where the shutter of the laser welding device according to one embodiment is opened.

Further, as illustrated in FIGS. 3 and 4, the shutter 7 includes a movable portion 71 and a pair of fixed portions 72. The movable portion 71 is disposed so as to be interposed between the pair of fixed portions 72. The movable portion 71 is formed in a plate shape. A circular opening is provided in the fixed portion 72. The circular opening is formed to have a diameter larger than a diameter of the passing laser beam L. The opening of the fixed portion 72 is configured so that opening/closing can be switched by moving the movable portion 71. That is, the pair of fixed portions 72 is fixed to the first tubular portion 50 of the tubular portion 5. Further, the movable portion 71 is configured to be movable with respect to the pair of fixed portions 72. Further, the shutter 7 is configured so that switching of opening and closing is controlled by the control unit 200.

The gas injection nozzle 6b is disposed on the chamber 3 side of the laser transmission window 20. Further, the gas injection nozzle 6b is configured to introduce the inert gas toward the chamber 3 side. Further, the gas injection nozzle 6b is disposed between the shutter 7 and the laser transmission window 20. That is, when the shutter 7 is closed, the gas injection nozzle 6b is isolated in a space on the laser transmission window 20 side with respect to the chamber 3.

The gas injection nozzle 6b has a through port at a center so that the laser beam L passes therethrough. Further, in the gas injection nozzle 6b, an injection port for injecting the inert gas is formed in a circumferential shape on an inner wall of the through port.

The control unit 200 is configured to control each unit of the laser welding device 1. Specifically, the control unit 200 is configured to control the irradiation of the laser beam L by the laser beam irradiation unit 2. Further, the control unit 200 is configured to control the opening or closing of the chamber 3. Further, the control unit 200 is configured to control the supply of the inert gas by the inert gas supply unit 6. Further, the control unit 200 is configured to control the opening or closing of the shutter 7. Further, the control unit 200 is configured to acquire a measurement result of vacuum measurement by the vacuum gauge 8. Further, the control unit 200 is configured to control the drive of the vacuum pump 9. Further, the control unit 200 is configured to control the drive of the rotation drive mechanism 11. Further, the control unit 200 is configured to control the opening or closing of the opening valve 13.

Here, in the present embodiment, when the pressure in the chamber 3 is returned to the atmospheric pressure, the control unit 200 is configured to perform control to stop the irradiation of the laser beam L performed by the laser beam irradiation unit 2, close the shutter 7, and then, open the opening valve 13. Further, the control unit 200 is configured to control the opening of the shutter 7 in a state where the inert gas is introduced from the gas injection nozzle 6b when the pressure inside the chamber 3 is reduced by the vacuum pump 9.

(Workpiece Replacement Process)

Next, a workpiece W replacement process performed by the control unit 200 will be described with reference to FIG. 5. The workpiece W replacement process is performed when a welding process of a preceding workpiece W is completed and the preceding workpiece W in the chamber 3 is replaced with a succeeding workpiece W.

In Step S1 of FIG. 5, the irradiation of the laser beam L is stopped. Accordingly, the welding of the preceding workpiece W is completed. In Step S2, the shutter 7 is closed, as illustrated in FIG. 3. Accordingly, the chamber 3 in which the workpiece W is disposed is separated from the space in which the laser transmission window 20 and the gas injection nozzle 6b are disposed.

In Step S3, the opening valve 13 is opened. Accordingly, the inside of the chamber 3 in which the workpiece W is disposed is returned to the atmospheric pressure (pressure is returned). In Step S4, the chamber is opened. Specifically, the chamber 3 is opened so that the workpiece W can be taken out from the chamber 3.

In Step S5, the preceding workpiece W is carried out from the chamber 3. Accordingly, there is no workpiece W in the chamber 3. In Step S6, the succeeding workpiece W is carried in the chamber 3. Accordingly, the workpiece W to be welded next is disposed in the chamber 3.

In Step S7, the chamber 3 is closed. In Step S8, the opening valve 13 is closed.

In Step S9, the shutter 7 is opened, as illustrated in FIG. 4. When the shutter 7 is opened, the inert gas is introduced into the tubular portion 5 from the gas injection nozzle 6b. In Step S10, the vacuum pump 9 is turned on and evacuation in the chamber 3 is started. Therefore, the workpiece replacement process is completed. When the evacuation is completed, the irradiation of the laser beam L starts, and a welding process of the succeeding workpiece W starts.

Effect of Present Embodiment

In the present embodiment, the following effects can be obtained.

In the present embodiment, as described above, the shutter 7 is provided, which is disposed on the chamber 3 side with respect to the laser transmission window 20 and closed when the pressure in the chamber 3 is returned to the atmospheric pressure after the laser welding. Accordingly, when the workpiece W is welded under a low pressure and then the chamber 3 is returned to the atmospheric pressure, it is possible to prevent the solidified particles of the metal vapor in the chamber 3 from reaching the laser transmission window 20, and thus, it is possible to prevent the solidified particles of the metal vapor from adhering to the laser transmission window 20. As a result, it is possible to prevent the particles from adhering to the laser transmission window 20 and blocking the transmission of the laser beam L, and thus, the workpiece W can be stably welded by the laser beam L. Further, by providing the shutter 7, it is not necessary to gradually return the inside of the chamber 3 to the atmospheric pressure so as not to generate a flow having a high velocity, and thus, the inside of the chamber 3 can be rapidly returned to the atmospheric pressure. As a result, a time required to return to the atmospheric pressure can be shortened, and thus, it is possible to suppress a decrease in production efficiency of welding the workpiece W.

Further, in the present embodiment, as described above, the control unit 200 is provided, which performs control to stop irradiation of the laser beam L performed by the laser beam irradiation unit 2, close the shutter 7, and then open the opening valve 13, when the pressure in the chamber 3 is returned to the atmospheric pressure. Accordingly, it is possible to prevent the laser beam L from being blocked by the shutter 7 by closing the shutter after stopping the irradiation of the laser beam L. Further, even when the atmospheric pressure air flows into the chamber 3 and a flow having a high flow velocity is generated by opening the opening valve 13 after closing the shutter 7, it is possible to prevent the flow from reaching the laser transmission window 20. As a result, it is possible to effectively prevent the solidified particles of the metal vapor from adhering to the laser transmission window 20.

Further, in the present embodiment, as described above, the shutter 7 is made of the material which does not allow the solidified particles of the metal vapor generated during the welding to pass through when the shutter 7 is closed. Accordingly, by closing the shutter 7, it is possible to reliably prevent the solidified particles of the metal vapor from reaching the laser transmission window 20.

Further, in the present embodiment, as described above, the tubular portion 5 through which the laser beam L emitted from the laser beam irradiation unit 2 passes and which communicates with the chamber 3 is provided, in which the laser transmission window 20 and the shutter 7 are disposed in the tubular portion 5. Accordingly, the tubular portion 5 having an internal dimension that allows the laser beam L to pass through can be closed by the shutter 7. Therefore, an area closed by the shutter 7 can be reduced as compared with a case where a portion of the chamber 3 having a relatively large volume in which the workpiece W is disposed is closed by the shutter 7. Therefore, it is possible to prevent a size of the shutter 7 from increasing.

Further, in the present embodiment, as described above, the tubular portion 5 includes the first tubular portion 50 in which the laser transmission window 20 and the shutter 7 are disposed and the second tubular portion 60 which is disposed to be adjacent to the chamber 3 side with respect to the first tubular portion 50 and has the area larger than that of the first tubular portion 50 in the cross section perpendicular to an optical axis direction A1 of the laser beam L. Accordingly, the first tubular portion 50 having the cross-sectional area smaller than that of the second tubular portion 60 can be closed by the shutter 7, and thus, it is possible to effectively prevent the size of the shutter 7 from increasing. Further, the volume of the space between the workpiece W (chamber 3) and the laser transmission window 20 can be increased by the second tubular portion 60. Therefore, the metal vapor generated from the welding position (processing point P) of the workpiece W when the workpiece W is welded under a low pressure can be prevented from reaching the laser transmission window 20. As a result, it is possible to prevent the solidified particles of the metal vapor from adhering to the laser transmission window both during welding and when returning to the atmospheric pressure after the welding.

Further, in the present embodiment, as described above, the gas injection nozzle 6b is provided, which is disposed on the chamber 3 side of the laser transmission window 20 and introduces the inert gas toward the chamber 3 side. Accordingly, when the workpiece W is welded under a low pressure, the metal vapor generated from the welding position (processing point P) of the workpiece W can be pushed back to the chamber 3 side by the inert gas, and thus, it is possible to effectively prevent the metal vapor from reaching the laser transmission window 20.

Further, in the present embodiment, as described above, the gas injection nozzle 6b is disposed between the shutter 7 and the laser transmission window 20. Accordingly, the gas injection nozzle 6b and the chamber 3 can be separated by the shutter 7. Therefore, when the workpiece W is welded under a low pressure and then the pressure in the chamber 3 is returned to the atmospheric pressure, it is possible to prevent the solidified particles of the metal vapor from reaching the gas injection nozzle 6b. As a result, it is possible to prevent particles from adhering to and clogging the gas injection nozzle 6b. Further, even when the space in which the laser transmission window 20 is disposed is closed by the shutter 7 in a low pressure state, the pressure can be increased by introducing the inert gas from the gas injection nozzle 6b, and thus, it is possible to prevent the space in which the laser transmission window 20 is disposed from having a pressure lower than that on the chamber 3 side. As a result, when the shutter is opened, it is possible to prevent the solidified particles of the metal vapor from entering the laser transmission window 20 side.

Further, in the present embodiment, as described above, the control unit 200 is configured to control opening the shutter 7 in a state where the inert gas is introduced from the gas injection nozzle 6b when the pressure in the chamber 3 is reduced by the vacuum pump 9. As a result, it is possible to effectively prevent the pressure in the space where the laser transmission window 20 is disposed from being lower than that on the chamber 3 side. Therefore, when the shutter 7 is opened, it is possible to effectively prevent the solidified particles of the metal vapor from entering the laser transmission window 20 side.

Further, in the present embodiment, as described above, the shutter 7 includes a gate valve. Accordingly, the space in which the laser transmission window 20 is disposed can be reliably sealed with respect to the chamber 3 side by the gate valve.

Modification Example

It should be noted that the above-disclosed embodiment is exemplary in all respects and is not considered to be restrictive. A scope of the present invention is illustrated by claims rather than the descriptions of the above-described embodiment, and further includes all modifications (modification examples) within the meaning and scope equivalent to the claims.

For example, in the above embodiment, the workpiece is the torque converter, but the present invention is not limited to this. In the present invention, the workpiece may be a component other than the torque converter.

Further, in the above embodiment, the laser beam irradiation unit is illustrated an example of having a long focal length (focal length F: about 900 [mm]), but the present invention is not limited to this. In the present invention, the laser beam irradiation unit may have a focal length exceeding about 900 [mm]. Moreover, the laser beam irradiation unit may have a focal length less than about 900 [mm].

Further, in the above embodiment, an example of the configuration in which the shutter includes the gate valve is illustrated, but the present invention is not limited to this. In the present invention, the shutter may be configured by other than the gate valve.

Further, in the above embodiment, an example of the configuration in which the shutter is opened or closed under the control of the control unit is illustrated, but the present invention is not limited to this. In the present invention, the shutter may be opened or closed by an operation of an operator.

Further, in the above embodiment, an example of the configuration in which the space in which the laser transmission window is disposed is sealed by closing the shutter is illustrated, but the present invention is not limited to this. In the present invention, a filter that does not allow the solidified particles of the metal vapor to pass through the shutter may be used. As a result, when the shutter is closed, the solidified particles of the metal vapor cannot pass through the shutter and air can pass through the shutter. Therefore, it is possible to reduce and return the pressures in the space where the laser transmission window is disposed and the chamber while preventing the particles from reaching and adhering to the laser transmission window.

Further, in the embodiment, an example of the configuration in which the exhaust port is formed in the side wall portion of the chamber is illustrated, but the present invention is not limited to this. In the present invention, the exhaust port may be formed in the upper wall portion, the lower wall portion, or side wall portions of other surfaces according to the rotation direction of the workpiece.

Further, in the above embodiment, an example of the configuration in which the gas injection nozzle (gas introduction unit) for introducing the inert gas is provided is illustrated, but the present invention is not limited to this. In the present invention, it is not necessary to provide the gas introduction unit.

Further, in the above embodiment, an example of the configuration in which the gas injection nozzle (gas introduction unit) for introducing the inert gas is disposed between the shutter and the laser transmission window is illustrated, but the present invention is not limited to this. In the present invention, the gas introduction unit may be provided on the chamber side with respect to the shutter.

Further, in the above embodiment, an example of the configuration in which the opening valve (opening unit) is provided in the side wall portion of the chamber on the side opposite to the tubular portion is illustrated, but the present invention is not limited to this. In the present invention, the opening unit may be provided in the upper wall portion, the lower wall portion, or the side wall portions of other surfaces of the chamber, or may be provided on the tubular portion.

Further, in the above embodiment, an example of the configuration in which the laser transmission window side with respect to the shutter is returned to the atmospheric pressure by introducing the inert gas through the gas injection nozzle (gas introduction unit) is illustrated, but the present invention is not limited to this. In the present invention, the opening unit may be provided on the laser transmission window side with respect to the shutter, and the pressure in the space where the transmission window is disposed may be returned to the atmospheric pressure by opening the opening unit after closing the shutter.

Further, in the above embodiment, for convenience of illustration, the processing operations of the control unit are described using a flow-driven flowchart in which the processing operations of the control unit are sequentially processed along the processing flow, but the present invention is not limited to this. In the present invention, the processing operation of the control unit may be performed by event-driven processing that executes processing in event units. In this case, the processing operation may be completely performed by the event-driven processing, or may be performed by a combination of the event-driven processing and flow-driven processing.

REFERENCE SIGNS LIST

1: laser welding device
2: laser beam irradiation unit
3: chamber
3d: internal space
5: tubular portion
6b: gas injection nozzle (gas introduction unit)
7: shutter
9: vacuum pump (pump)
13: opening valve (opening unit)
20: laser transmission window
50: first tubular portion
60: second tubular portion
100: torque converter (workpiece)
200: control unit
L: laser beam
W: workpiece

The invention claimed is:
1. A laser welding device comprising:
a chamber which has an internal space in which a workpiece is disposed;
a laser beam irradiation unit which irradiates the workpiece with a laser beam to weld the workpiece;
a pump which suctions air in the chamber and decreases a pressure in the chamber;

a laser transmission window through which the laser beam emitted from the laser beam irradiation unit is transmitted; and a shutter which is disposed on a chamber side with respect to the laser transmission window and configured to close so as to isolate the laser transmission window from the internal space when the pressure in the chamber is returned to an atmospheric pressure after laser welding.

2. The laser welding device according to claim 1, further comprising:

an opening unit which is provided in the chamber and opened when the pressure in the chamber is returned to the atmospheric pressure; and a control unit which performs control, when the pressure in the chamber is returned to the atmospheric pressure, to stop irradiation of the laser beam performed by the laser beam irradiation unit, close the shutter, and then open the opening unit.

3. The laser welding device according to claim 1, wherein the shutter is made of a material which does not allow solidified particles of metal vapor generated during welding to pass through when the shutter is closed.

4. The laser welding device according to claim 1, further comprising:

a tubular portion through which the laser beam emitted from the laser beam irradiation unit passes and which communicates with the chamber, wherein the laser transmission window and the shutter are disposed in the tubular portion.

5. The laser welding device according to claim 4, wherein the tubular portion includes a first tubular portion in which the laser transmission window and the shutter are disposed and a second tubular portion which is disposed to be adjacent to the chamber side with respect to the first tubular portion and has an area larger than that of the first tubular portion in a cross section perpendicular to an optical axis direction of the laser beam.

6. The laser welding device according to claim 1, further comprising:

a gas introduction unit which is disposed on the chamber side of the laser transmission window and introduces an inert gas toward the chamber side.

7. The laser welding device according to claim 6, wherein the gas introduction unit is disposed between the shutter and the laser transmission window.

8. The laser welding device according to claim 7, further comprising:

a control unit which controls opening or closing of the shutter, wherein the control unit is configured to control opening the shutter in a state where the inert gas is introduced from the gas introduction unit when the pressure in the chamber is reduced by the pump.

9. The laser welding device according to claim 1, wherein the shutter includes a gate valve.

* * * * *